(12) United States Patent
Mehta et al.

(10) Patent No.: US 11,789,977 B1
(45) Date of Patent: Oct. 17, 2023

(54) HIERARCHICAL AGGREGATION AND DISAGGREATION OF TIME SERIES DATA FORECASTS

(71) Applicant: Amazon Technologies, Inc., Seattle, WA (US)

(72) Inventors: Chetan Mehta, Seattle, WA (US); Anish Borkar, Cambridge, MA (US); Parnika Singh, Seattle, WA (US); Divya Hariharan, Seattle, WA (US); Anup Bharadwaj, Seattle, WA (US); Yasaswi Vempati, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/486,599

(22) Filed: Sep. 27, 2021

(51) Int. Cl.
| | | |
|---|---|---|
| G06F 16/28 | (2019.01) | |
| G06F 16/22 | (2019.01) | |
| G06F 16/2458 | (2019.01) | |

(52) U.S. Cl.
CPC ........ *G06F 16/282* (2019.01); *G06F 16/2264* (2019.01); *G06F 16/2477* (2019.01); *G06F 16/287* (2019.01)

(58) Field of Classification Search
CPC ............... G06F 16/282; G06F 16/2264; G06F 16/2477; G06F 16/287
See application file for complete search history.

(56) References Cited

U.S. PATENT DOCUMENTS

| | | | | |
|---|---|---|---|---|
| 2012/0030164 | A1* | 2/2012 | Gutlapalli | G06F 16/951 707/E17.107 |
| 2012/0089609 | A1* | 4/2012 | Trovero | G06Q 10/063 707/738 |
| 2012/0166486 | A1* | 6/2012 | Visser | G06F 40/177 707/E17.049 |
| 2018/0260106 | A1* | 9/2018 | Leonard | G06F 16/2462 |
| 2020/0104401 | A1* | 4/2020 | Burnett | G06F 16/287 |
| 2021/0209696 | A1* | 7/2021 | Sayed | G06Q 20/3221 |

OTHER PUBLICATIONS https://www.saponlinetutorials.com/sap-apo-advanced-planning-optimization.
https://www.sap.com/products/integrated-business-planning.html.
https://blueyonder.com/solutions/demand-planning.
https://blueyonder.com/solutions/luminate-logistics.
https://www.oracle.com/scm/supply-chain-planning/demand-management/.
https://www.anaplan.com/solutions/demand-planning-software/.
https://www.kinaxis.com/en/soiutions/demand-planning.
https://www.e2open.com/wp-content/uploads/2019/01/Demand_Planning_Data_Sheet_digital_F.
https://www.infor.com/solutions/scm/planning.
https://www.uamasoft.com.
https://www.logility.com/?lead=Google-Ads&utm_source=adwords&utm_medium=cpc&utm_campaign=Brand&gclid=EAlalQobChMlyoGhycbP8glVFQnnCh1h8AlqEAAYASAAEgKjePD_BwE.
https://www.ifs.com.
https://www.epicor.com/en-us/?utm_source=google&utm_medium=paidsearch&utm_term=%2Bepicor%20%2Bsystem&utm_content=g-c&utm_campaign=7013x000002DNKu&gclid=EAlalQobChMI807XlcfP8gIVRAPnCh0jjQVfEAAYAIAAEglZc_D_BwE.
https://demandworks.com.
https://o9solutions.com.
https://www.antuit.ai/?utm_medium=ppc&utm_term=antuit&utm_campaign=Antuit+-+Brand+Search&utm_source=adwords&hsa_grp=69411112262&hsa_tgt=kwd-309167309417&hsa_net=adwords&hsa_ad=355678217024&hsa_ver=3&hsa_cam=2036104947&hsa_mt=b&hsa_src=g&hsa_kw=antuit&hsa_acc=7223127684&gclid=EAlalQobChMIwMuAgMjP8glVmz6tBh1k6ASvEAAYASAAEgl7NfD_BwE.
https://foxtrotsystems.com.

* cited by examiner

*Primary Examiner* — Cam Y T Truong
(74) *Attorney, Agent, or Firm* — Davis Wright Tremaine LLP

(57) ABSTRACT

In various embodiments described in the present disclosure overrides to forecast data are disaggregated to a lowest hierarchy level and derived forecasts are created based at least in part on the results. In one example, values included in the forecast are organized into a set of dimensions where the dimensions are associated with a hierarchy level of a plurality of hierarchy levels.

20 Claims, 9 Drawing Sheets

US 11,789,977 B1

HIERARCHICAL AGGREGATION AND DISAGGREATION OF TIME SERIES DATA FORECASTS

BACKGROUND

In various contexts, managing computing resources is of utmost importance for many computing resource service providers. Computing resource service providers often maintain data centers of computing resources at various geographic locations that provide various computing services to the user. The computing resource service provider can provide a plurality of different services that can be leveraged together by the computing resource service provider and/or users to execute robust and complex applications. In one example, users can utilize one or more services of the computing resource service provider to generate time series data and or forecast data as part of applications executed by the users.

BRIEF DESCRIPTION OF THE DRAWINGS

Various techniques will be described with reference to the drawings, in which.

DETAILED DESCRIPTION

Figure 1:
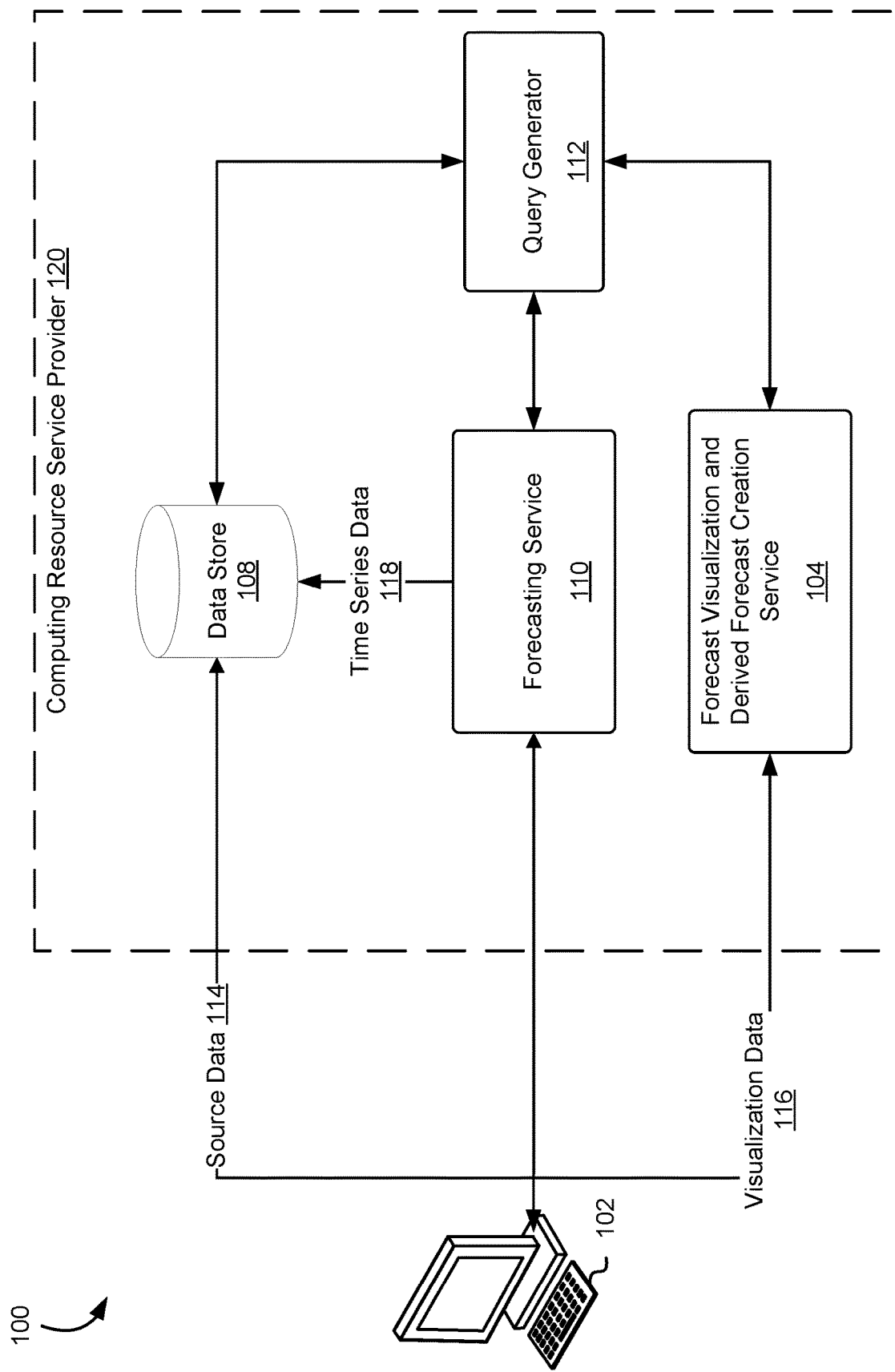
FIG. 1 illustrates an environment in which a forecast visualization service provides visualization data to users in accordance with an embodiment.

Techniques and systems described below relate to aggregation and disaggregation of time series data or other data used during forecasting. In one example, a computing resource service provider provides users with a forecast visualization service that enables users to generate forecasts (e.g., demand forecasts), modify the generated forecasts, and create derived forecasts based at least in part on the generated forecasts. The data generated by the forecast visualization service, for example, can enable users to create datasets upon which inventory plans can be created and supply chain problems can be addressed. As described in greater detail below, users provide data to the computing resource service provider or service thereof, this data can include historical data used by a forecasting service to generate a forecast or other time series data.

The user and/or time series data can include or otherwise be organized into a plurality of dimensions and hierarchy levels. In one example, a first dimension includes location which can be further organized into a plurality of hierarchy levels (e.g., city, county, state, region, country, continent, etc.). Furthermore, based at least in part on this data, the forecast visualization service enables users to filter elements across dimensions and hierarchy levels in both historical data and/or forecasts. For example, for a specific product and/or category of products, users can view forecasts based at least in part on filters associated with one or more dimensions including the aggregation of values at lower levels. Specifically, this means that the forecast visualization service can aggregate data across dimensions and/or hierarchy levels (e.g., sales of products or categories of products for all locations within a region).

In addition, the forecast visualization service enables users to override values generated by the forecasting service and create derived forecasts where the overridden values are disaggregated down to the lower levels of hierarchy levels. In one example, the user overrides the value forecasted for the total sales of a product within a region including a plurality of locations. In this example, the forecast visualization service disaggregates the override at the region level to one or more lower levels of the plurality of hierarchy levels (e.g., city, county, state) such that the override can be used to modify values at the lower hierarchy levels. The forecast visualization service can utilize various methods to disaggregate the override value to one or more values at lower hierarchy levels. In one example, the forecast visualization service determines the proportion of the values at the lower hierarchy levels and assigns the override based at least in part on the proportion. In addition, once the forecast visualization service has disaggregated the override values to the lowest level of the hierarchy levels, this new dataset (e.g., the dataset representing the disaggregation of the override values) can be saved and utilized by the user to create new visualizations.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) aggregating and disaggregating time series data; (2) targeting supply chain problems; (3) generating and filtering visualizations of time series data; and (4) overriding forecast values and disaggregating the override values across time series data.

FIG. 1. illustrates an environment 100 in which a forecast visualization service 104 provides visualization data 116 to a client device 102 in accordance with at least one embodiment. In various embodiments, a computing resource service provider 120 provides users (e.g., via the client device 102) a plurality of services such as the forecast visualization service 104, a forecasting service 110, and a data store 108. As described in greater detail below, the computing resource service provider 120, in various embodiments, provides additional services not illustrated in FIG. 1 for simplicity. In addition, the client device 102 or other computing device, in an embodiment, provides source data to the computing resource service provider 120 for storage in the data store 108. In various embodiments, the forecast visualization service 104, the forecasting service 110, and/or the data store 108 are part of a demand planning service offered by computing resource service provider 120.

In an embodiment, the client device 102 is a computing device operable to access systems and/or services such as the forecast visualization service 104, the forecasting service 110, the data store 108, and/or other service of the computing resource service provider 120. In some embodiments, the client device 102 is a device operated by a user of the computing resource service provider 120 that hosts one or more of the systems depicted in FIG. 1. The user, for example, includes an individual, a group of individuals, a business entity or other organization that has a relationship with the computing resource service provider 120 (e.g., a customer of computing resource service provider 120), the various systems, and/or services. Examples of such a client device 102 include one or more instances of a physical computing instance (e.g., a physical server computer, a mobile communication device, a laptop computer, a tablet computer, a personal computer, a mainframe, etc.), one or more instances of a virtual computing instance, such as a client accessible virtual machine hosted on one or more computer servers, other computing system capable of communicating with various systems and/or services, or any combination thereof In some examples, a "service" refers to an executing computer application that provides functionality to another computer application.

In some embodiments, the computing resource service provider 120 is an entity that provides to the user one or more computing resources individually or as a combination of services of a distributed computer system. Examples of types of computing resources provided by the computing resource service provider 120 include Infrastructure as a service (IaaS), platform as a service (PaaS), and/or software as a service (SaaS). The one or more services of the computing resource service provider 120, for example, are accessible to users via a network and include services not shown in FIG. 1, for simplicity, such as virtual computer system services, block level data storage services, cryptography services, on demand data storage services, notification services, authentication services, policy management services, task services and/or other such services. Not all embodiments described include all of the services described, and additional services may be provided in addition to, or as an alternative to, the services explicitly described.

Users of the computing resource service provider 120, in an embodiment, communicate with the one or more services via an interface, such as a web services interface or any other type of customer interface. For example, the user interfaces described in greater detail below in connection with FIGS. 2-6. The one or more services provided by a computing resource service provider 120, in various embodiments, include separate interfaces and subsets of the services can include individual interfaces in addition to, or as an alternative to, a common interface. In an embodiment, the user communicates (e.g., via the client device 102) with the computing resource service provider 120 through a network, the network includes a communication network, such as the Internet, an intranet, an internet service provider (ISP) network, and/or some other such network as described in the present disclosure.

In an embodiment, the client device 102 communicates with the various systems and/or services through one or more communication networks, such as the Internet. Further, the various communications to/from the client device 102, in one example, are orchestrated by a browser or other application executing on the client device 102 such as those described in FIGS. 2-6. In an embodiment, the client device 102 communicates with the forecast visualization service 104 through the one or more Application Programming Interfaces (APIs). In such examples, the API includes a set of subroutine definitions, communication protocols, and/or software tools that provide a method of communication to/from the client device 102 and the forecast visualization service 104.

In various embodiments, the source data 114 includes a variety of user data such as time series data, historical data, sales data, or any other data that can be used by the forecasting service 110 to generate forecasts or otherwise generate predictions. In one example, the source data 114 include sales data generated based at least in part on sales software or other enterprise level software utilized by the user. In other examples, the source data includes a dataset, database, or other organized data. In various embodiments, the source data 114 is organized into a plurality of dimensions of a plurality of hierarchy levels. In one example, the dimensions of the source data 114 include product, geography, channel, customer, time, and/or other logical division of data. Furthermore, in various embodiments, a particular dimension (e.g., product) is organized into a plurality of hierarchy levels, where the hierarchy levels represent a relationship between elements of the dimension. In one example, a particular dimension (e.g., a product dimension) is organized into two hierarchy levels perishable products and non-perishable products. In addition, such an example, perishable products hierarchy level can be further organized into dimension and/or hierarchy levels. For example, a perishable product such as mustard can be divided into types of mustard (e.g., spicy, brown, Dijon, horseradish, yellow, etc.), creating an additional hierarchy level associated with the perishable product hierarchy level.

In various embodiments, different organizations of the source data 114 can be used in connection with the techniques and systems described in the present disclosure. In addition, the source data 114, in an embodiment, includes data at the lowest granularity level and/or hierarchy level which can be used to aggregate data at one or more higher levels (e.g., hierarchy levels). For example, returning to the example above, sales values for the individual types of mustard (e.g., spicy, brown, Dijon, horseradish, yellow, etc.) are considered data at the lowest hierarchy level and/or granularity level. Furthermore, in such an example, the forecast visualization service 104 can generate visualizations of the source data 114 and/or time series data 118 by at least aggregating the values associated with the types of mustard (e.g., dimensions associated with a particular hierarchy level). Similarly, as described in greater detail below, when the user via the client device 102 overrides a value associated with a particular dimension at a particular hierarchy level, the forecast visualization service 104 can disaggregate the value to one more or more hierarchy levels below the particular hierarchy level (e.g., an override of a value associated with mustard would be disaggregated down to values associated with types of mustard).

The forecasting service 110, in an embodiment, is a service that provides estimations and/or predictions based at least in part on the source data 114. In one example, the forecasting service 110 provides demand estimates based at least in part on historical data. In various embodiments, the forecasting service 110 includes one or more computing devices such as a server computer system executing source code or other logic that, as a result of being executed, causes the one or more computing devices to perform the operations described in the present disclosure. In one example, the forecasting service 110 generates time series data 118 using one or more machine learning algorithms to generate predictions based at least in part on an input such as the source data 114. In an embodiment, the time series data 118 includes a series and/or set of data points indexed, listed, graphed, or otherwise organized in time order. In one example, the time series data includes predicted future values generated based at least in part on previously observed values in a sequence taken at successive equally spaced intervals of time. Specific examples of the time series data 118 include predicted sales figures, quarterly profit estimations, stock estimations, order predictions, or other values predicted at regular or irregular intervals.

In various embodiments, for the source data 114, time series data 118, or other datasets described in the present disclosure, with regard to time as a dimension of the dataset, the hierarchy levels are associated with units of time from the lowest (e.g., minutes) unit to the highest (e.g., years) unit. Furthermore, in various embodiments, for one or more dimensions of a particular dataset (e.g., the source data 114 and/or time series data 118), the user defines hierarchy levels and/or can reorder the hierarchy levels. As described in greater detail below, forecasting service 110, in an embodiment, obtains the source data 114 which is used to train one or more predictive models that are used to generate predictions for one or more forecasting intervals. Furthermore, in some embodiments, training data (e.g., historical data) is split into k sets of training data. In such embodiments, the one or more prediction models are then trained using k−1 sets of training data with the remaining set of training data used to measure the performance of the one or more predictive models. Once the one or more prediction models are trained, forecasting service 110, in various embodiments, generates the time series data 118 representing a forecast.

In various embodiments, the forecasting service 110 utilizes one or more prediction algorithms including any number and/or combination of algorithms such as the Holt-Winters exponential triple smoothing (HW) algorithm, the Autoregressive (AR) algorithm, Moving Average (MA) algorithm, the Autoregressive Moving Average (ARMA) algorithm, the Autoregressive Integrated Moving Average (ARIMA) algorithm, and the Exponential Smoothing (ES) algorithm. Other techniques including extrapolation linear prediction, trend estimation, and/or growth curves can be used in accordance with various embodiments. In addition, the forecasting service 110, in an embodiment, uses a machine learning algorithm such as an artificial neural network (e.g., a recurrent neural network (RNN), deep learning, or convolutional neural network (CNN), etc.) to generate the time series data 118 and/or forecast data.

In some embodiments, the data store 108 includes one or more storage devices containing a repository for data objects, such as database records, flat files, or other data objects. Examples of such repositories include file systems, relational databases, non-relational databases, object oriented databases, comma delimited files, and other such storage implementations. For example, the data store 108 includes a database service that stores the source data 114, the time series data 118, and derived forecasts (e.g., forecasts generated based at least in part on an override from a user) in one or more databases. Furthermore, the forecast visualization service 104, in an embodiment, includes a query generator 112 which generates queries to the database to obtain information associated with the source data 114, the time series data 118, and derived forecasts. For example, based at least in part on filters selected by the user (e.g., via the client device 102), the query generator 112 generates a database query to obtain information from the database associated with the filters. As described in greater detail below in connection with FIGS. 2-6, the information obtained from a query (e.g., projected sales of a product in a region) can be used to generate visualizations to present to the user. In an embodiment, the discrete services shown in FIG. 1 are combined into a single service. In various embodiments, requests to obtain data from the data store 108 fulfilled by the query generator 112. In addition, in various embodiment, requests to store data in the data store 108 are made directly to the data store 108.

In various embodiments, users are able to visualize forecasts at various granularity (e.g., hierarchy levels) that are higher than the granularity at which the forecasts were generated. For example, based at least in part on the source data 114, the forecasting service 110 generates time series data 118 with a time-based granularity daily (e.g., values are forecasted for a series and/or set of days), users are then able to generate visualizations for hierarchy levels higher than daily (e.g., weekly, bi-weekly, monthly, etc.). In such embodiments, users are able to create derived forecasts at any valid aggregated granularity (e.g., any hierarchy level higher than the lowest hierarchy level). Returning to the example above, users can create a derived forecast at the hierarchy level of weekly (e.g., the aggregated granularity generated by at least combining 7 days) by overriding one or more aggregated values of the forecast. Furthermore, in such examples, the resulting derived forecasts (e.g., after disaggregation as described in greater detail below) can then still be visualized at the original granularity (e.g., daily).

Figure 2:
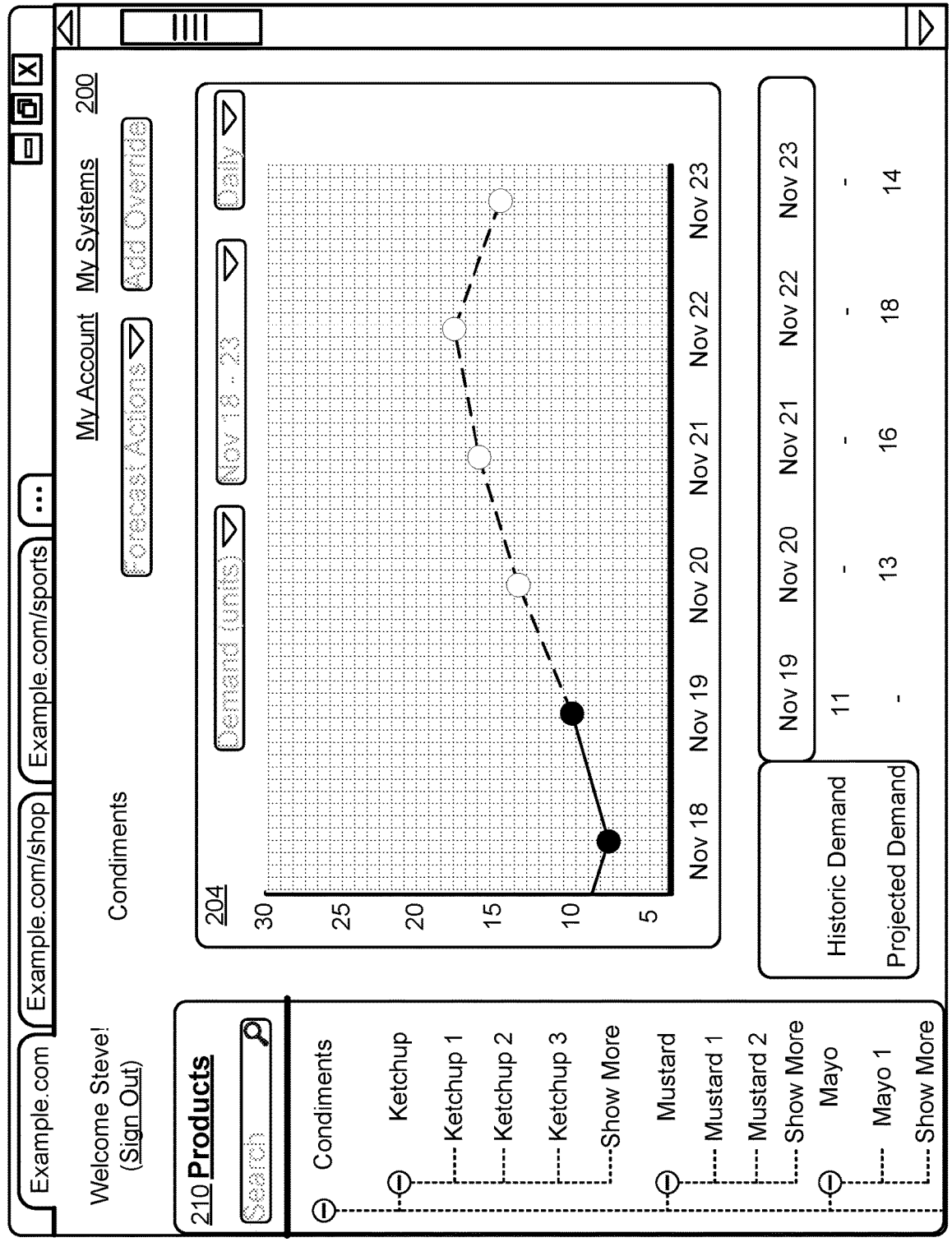
FIG. 2 shows an illustrative example of a user interface of a forecast visualization service for generating visualizations of time series data in accordance with an embodiment.

FIG. 2 shows an interface 200 of a forecast visualization service which may be displayed by an application executed by a computing system enabling a user to generate visualization and derived forecasts in accordance with an embodiment. The interfaces 200-600 of FIGS. 2-6, in various embodiments, include a computing program that is performed using any combination of hardware, firmware, and/or software. For example, the various operations described in connection with FIG. 2-6 can be carried out by a processor executing instructions stored in memory. The interfaces 200-600, for example, are embodied as computer usable instructions stored on computer storage media. In addition, in some embodiments, the interfaces 200-600 are provided by a standalone application, a service or hosted service (standalone or in combination with another hosted service), or a plug-in to another product, to name a few. In addition, the interfaces 200-600 are described, by way of example, with respect to the computer systems of FIG. 1. However, these processes may additionally or alternatively be executed by any one system, or any combination of systems, including, but not limited to, those described in the present disclosure.

Furthermore, in the interfaces 200-600, the links appear as textual words which enable the links to be selected using an appropriate input device such as a keyboard, mouse, touchscreen, or other input device. Selection of one of the commands from the interfaces 200-600, in various embodiments, causes an application displaying the interfaces to submit, pursuant to a Uniform Resource Locator (URL) associated with the selected command by the programming of the interface, a request, such as an HTTP request, for the content associated with the command to a server that provided the interface or another server.

Returning to FIG. 2, the interface 200 includes various graphical user interface elements, such as a "products" 210 pane, that enables the user to search for, select, generate filters, or otherwise view products represented in the interface 200. As described above, the products can correspond to one or more dimensions of a dataset such as time series data, historical data, or other data associated with the user. In various embodiments, the user interacts with the forecast visualization service by issuing commands through the interface 200. For example, the user through the interface 200 configures the forecast visualization service to generate a visualization 204. The interface 200 may be displayed by various applications, such as a mobile application or web browser.

For instance, on the left-hand side of the interface 200, various dimensions at various hierarchy levels (e.g., condiments, ketchup, ketchup 1) can be selected by the user causing various operations to be performed by the application displaying the interface 200 and/or other services such as the forecast visualization service and/or the query generator. In this example, the interface 200 includes various features of the forecast visualization service such as a 'search'. The 'search' feature, in an embodiment, enables the user to search for particular products and/or dimensions by name. In various embodiments, the name is unique to the product within the user's dataset and corresponds to the identifier provided by the user.

In various embodiments, the user utilizes the interface 200 to interact with and create the visualization 204. In addition, in various embodiments, the user utilizes the interface 200 to filter forecasts based at least in part on one or more hierarchy levels to perform various operations described in the present disclosure. For example, as illustrated at FIG. 2, the user has generated (using the interface) the visualization 204 showing demands in units at a daily interval for the dates of November 18-23. Furthermore, as illustrated at FIG. 2, the visualization 204 includes both historical data (shown as solid lines in FIG. 2) and forecast data (shown as dashed lines in FIG. 2). As described above, the historical data, in an embodiment, is obtained from the user and is used to generate the forecast data using one or more models.

In addition, as illustrated at FIG. 2, the user can select various hierarchy levels of the visualization 204 (e.g., through the dropdown menus illustrated in FIGS. 2-6). For example, the user can select various time-based granularities such as hourly, weekly, or monthly from the dropdown menu associated with the hierarchy level. In various embodiments, the time series data used to generate the visualization 204 has a lowest granularity (e.g., lowest hierarchy level) for visualization below which data cannot be generated. For example, if the lowest hierarchy level for a given time series dataset is daily, the visualization 204 cannot display data at an hourly hierarchy level. In yet other embodiments, in response to the user selecting a higher hierarchy level (e.g., weekly) the forecast visualization service or component thereof (e.g., query generator) aggregates the data from one or more lower hierarchy levels (e.g., daily) to generate the visualization 204.

The interface 200, in various embodiments, corresponds to operations that may be taken to manage or otherwise control tools and features provided by the forecast visualization service as described in the present disclosure. In various embodiments, selection of one of the commands (shown as test, buttons, dropdown menus, etc. in FIG. 2) from the interface 200, in various embodiments, causes an application displaying the interface 200 to cause to be generated and/or transmits API calls to the forecast visualization service. For example, selection of the "Add Override," causes the application displaying the interface 200 to generate an API call to the forecast visualization service to generate a derived forecast based at least in part on an override and navigate to one or more other displays such as those shown in FIGS. 4 and 5.

As described above, in various embodiments, the user data and/or user selected organization of data includes the lowest hierarchy level at which a forecast is generated. In one example, the user determines the organization of the dimensions and hierarchy levels associated with the dimensions. In such examples, the user can cause the forecast visualization service to visualize forecasts at any level of the hierarchy. In an embodiment, the hierarchy levels are associated with a particular dimension such as product, location, channel, time, or other dimensions as defined by the user. As illustrated in FIG. 2, the user is able to view forecasts by product and filter by one or more of the dimensional filters (e.g., product, location, time, etc.) that are uploaded as part of an input dataset (e.g., historical data) provided by the user. In various embodiments, the user defines one or more hierarchy levels that matches their needs (e.g., based on the application or business of the user) at various dimensions (e.g., product, location, time, and channel). In such embodiments, the one or more hierarchy levels for the various dimensions are included in the historical data or as separate data (e.g., a data object defining the dimensions and corresponding hierarchy levels).

In one example, the user is guided through the process of defining the one or more hierarchy levels for the various dimensions through an interface such as the interfaces 200-600. In various embodiments, the user specifies the order of hierarchies with which forecasts are to be visualized and/or generated. For example, the user defines the column names (e.g., dimensions) and corresponding hierarchy levels from the data provided by the user before requesting a forecast. Turning to the example illustrated in FIG. 2, the user defines the hierarchy for the "product" dimension such that the lowest level is "condiments" and above that is "ketchup," "mustard," and "mayo," and above that is "ketchup 1," "ketchup 2," and "ketchup 3." In an embodiment, the resulting forecast is generated based at least in part on the defined hierarchy levels which allow the user to visualize the forecasts in the interface 200 as per the defined hierarchy levels. In addition, in an embodiment, missing, incorrect, and/or conflicting data within the dimensions and/or hierarchy levels can be detected and a notification to the user is provide allowing the user to address the issue. In various embodiments, the forecast visualization service generates the dimensions and/or hierarchy levels without user intervention. In one example, the forecast visualization service generates the dimensions and/or hierarchy levels based at least in part on a format of the historical data.

In various embodiments, when visualizing forecasts (e.g., visualization 204) the user is able to apply filters that enables the user to view forecasts for the requested dimension (e.g., "ketchup") values. As illustrated in FIGS. 2-6, the forecast visualization service enables aggregation across various dimensions and hierarchy levels. In one example, the user is presented with a dropdown with pre-populated values of valid time-based granularity (e.g., "daily" as illustrated in FIG. 2) with which the forecast can be visualized. In this example, with a forecast horizon of 60, and granularity of daily (e.g., the particular hierarchy level associated with the daily values within the time series data), there are 60 data points of forecast. In an embodiment, index 1 corresponds to the first data point of the forecast and index 60 corresponds to the last data point.

In another embodiment, the time series data is aggregated to weekly data and index 1 represents the first week, index 2 represents the second week, and so on.

Figure 3:
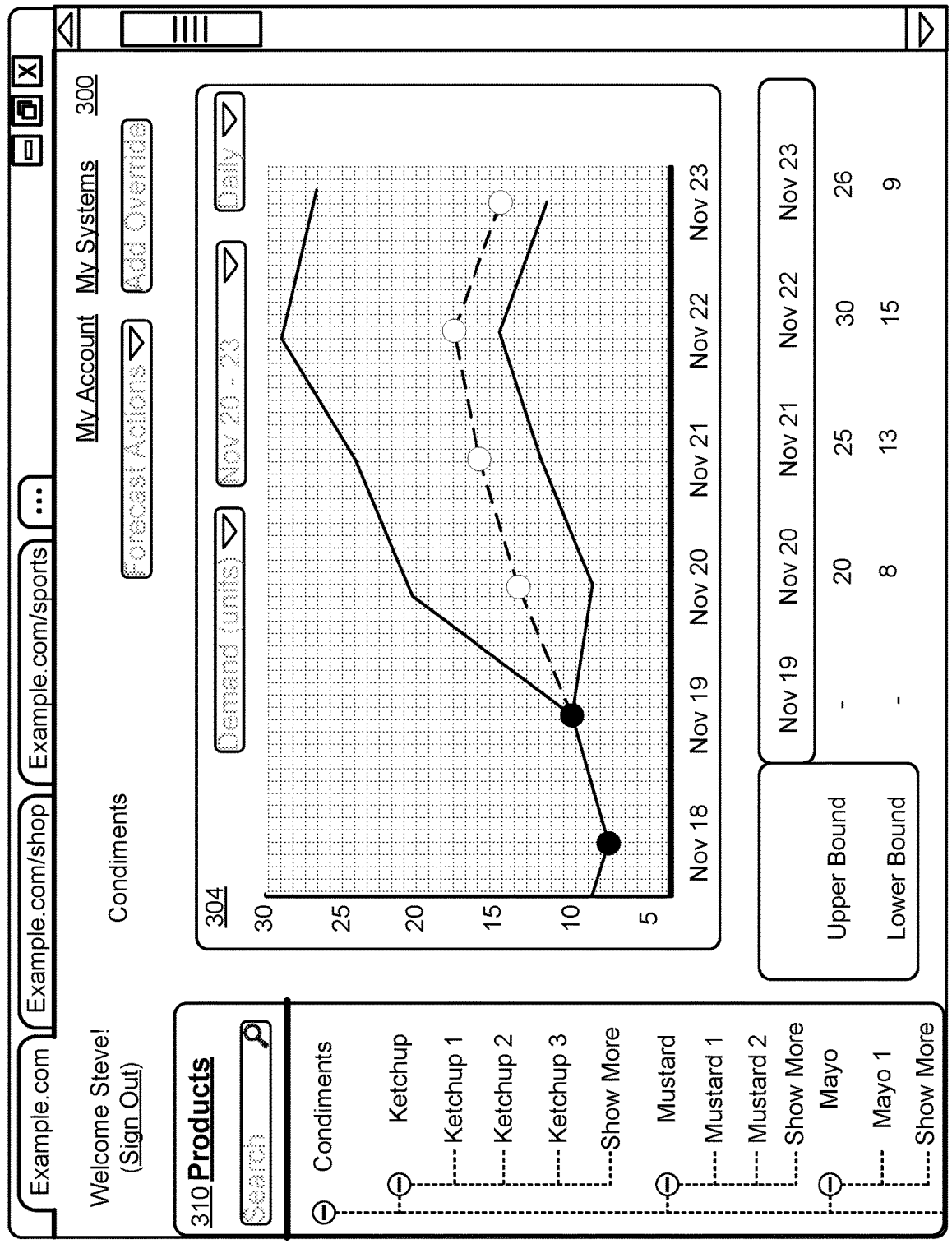
FIG. 3 shows an illustrative example of a user interface of a forecast visualization service for generating visualizations of time series data in accordance with an embodiment.

Turning now to FIG. 3, FIG. 3 illustrates an interface 300 in which an upper bound and a lower bound of a forecast is displayed in a visualization 304 in accordance with an embodiment. As described above, in various embodiments, a forecasting service generates a forecast based at least in part on source data such as historical data of a user. Furthermore, in an embodiment, the forecast includes an upper bound (e.g., T90) and a lower bound (e.g., T10). As illustrated in FIG. 3, the upper bound includes the line above the dashed line and the lower bound includes the line below the dashed line whether the dashed line indicates the forecasted values (e.g., T50). In an embodiment, the user is able to apply override values to the upper bound values and/or lower bound values included in the forecast. Furthermore, the users are able to override these values using any of the techniques described in the present disclosure, for example, those described below in connection with FIGS. 4 and 5.

Figure 4:
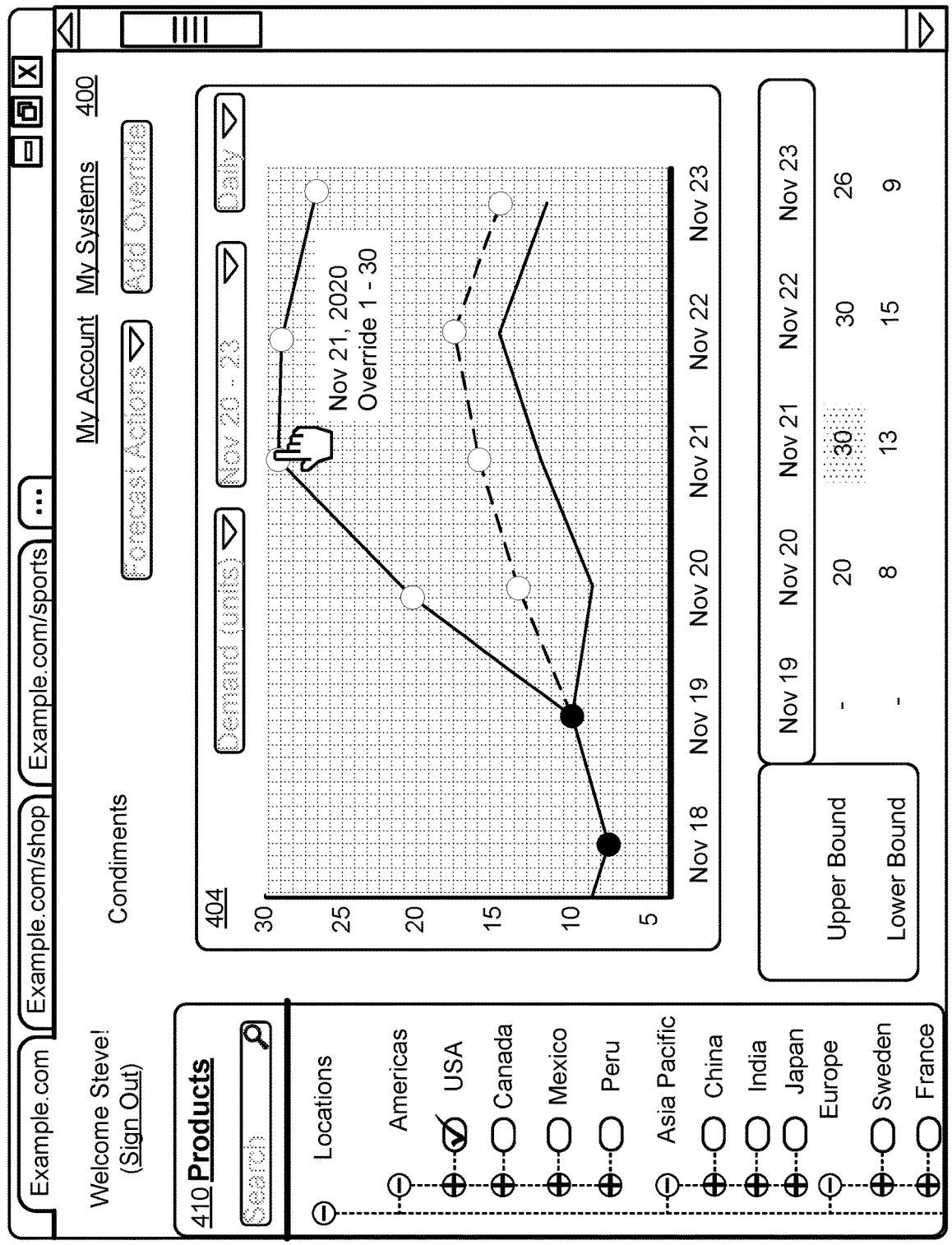
FIG. 4 shows an illustrative example of a user interface of a forecast visualization service for overriding values of time series data in accordance with an embodiment.

FIG. 4 illustrates an interface 400 in which an override is applied to a particular value of a forecast displayed in a visualization 404 in accordance with an embodiment. In an embodiment, the forecast visualization service enables the user to override one or more values included in the forecast and create a derived forecast based at least in part on the forecast and the override. As illustrated in FIG. 4, the user selects a particular value included in the forecast (e.g., the value of the time series data for Nov. 21, 2021). In an embodiment, selection of the particular value enables the user to override the particular value with another value using one or more input methods (e.g., modal pop-up, text field, voice commands, etc.). In one example, the user decides that the forecast for that particular value is too high or too low based on additional information.

As described above, the forecast displayed in the visualization 404, in an embodiment, includes aggregated values. In the example illustrated in FIG. 4, the forecast includes aggregated values for all locations (e.g., the dimension representing location) within the United States of America (e.g., corresponding to the hierarchy level of locations within the Americas). For example, in the forecast data, the hierarchy level under the hierarchy level that includes the United States of America includes north, south, east, and west, the values for these dimensions are aggregated (e.g., added together) to generate the value for the dimension United States of America. In embodiments where the visualization includes aggregated values, the forecast visualization service disaggregates the override to the lowest hierarchy level. Furthermore, although in the example illustrated in FIG. 4, the user provides an override for a value associated with the upper bound of the forecast, any forecasted value can be overridden by a user in accordance with the embodiments described in the present disclosure.

Figure 5:
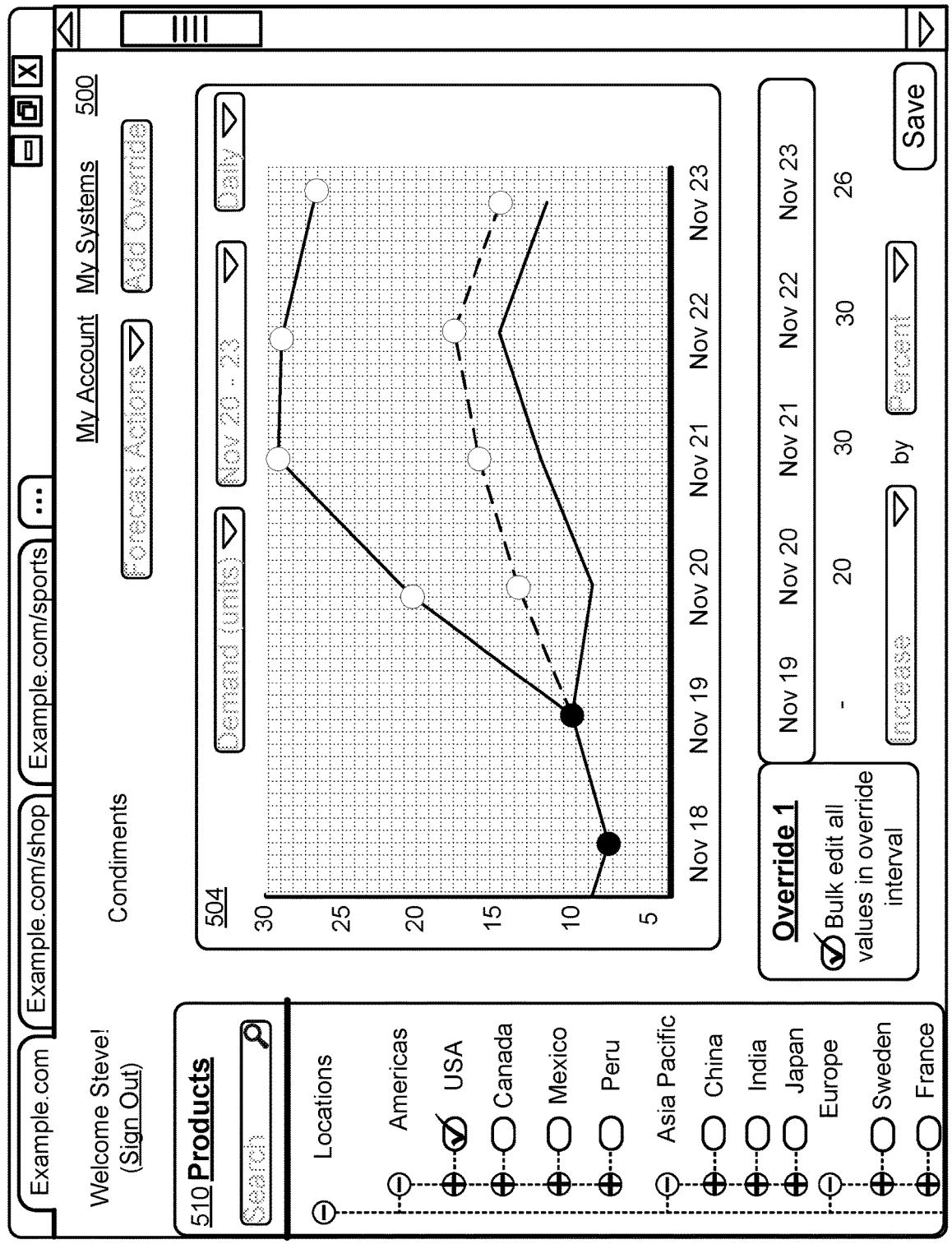
FIG. 5 shows an illustrative example of a user interface of a forecast visualization service for overriding values of time series data in accordance with an embodiment.

FIG. 5 illustrates an interface 500 in which a bulk override is applied to a set of values of a forecast displayed in a visualization 504 in accordance with an embodiment. In an embodiment, the forecast visualization service enables the user to override a plurality of values of the forecast. As illustrated in FIG. 5, the user can select from a dropdown menu various options for overriding a plurality of values of a forecast. For example, the user can increase or decrease values by a fixed amount or percentage. In addition, in embodiments where values are aggregated, the override can be applied at any time granularity (e.g., hierarchy level) that is the same (e.g., equal to) or higher than the hierarchy level at which the forecast was generated. In such embodiments, the validity of the override depends on the time granularity that is passed along with it. For example, for a forecast that was generated at daily granularity, every day within the forecast horizon is valid input for the override. However, in another example, when the forecasts are aggregated to a weekly granularity, only the first day of the week is valid. In an embodiment, when the date range is outside what is present in the forecasted dataset, an error is provided to the user.

In this example, the interface 500 includes various features of the forecast visualization service such as a 'save' feature. In various embodiments, the 'save' feature allows the user to save derived forecasts generated based at least in part on the override provided. For example, by selecting the "save" command, the user causes the forecast visualization service to generate and save a new forecast created in the interface 500. In an embodiment, selection of the "save" command causes the forecast visualization service to execute a process to disaggregate the override, for example, using the process 700 described in FIG. 7.

In an embodiment, the forecast visualization service executes a derived forecast workflow which causes a system executing the derived forecast workflow to create a map of multipliers that represents the multiple of change to be applied to values of the time series in a disaggregated view of the dataset for a given filter and/or dimension. In one example, when values of the forecast are aggregated based at least in part on time, the multiplier calculated at a higher time-based granularity (e.g., higher levels of the hierarchy levels) is the same for all values at the lowest possible time granularity (e.g., the lowest hierarchy level). For example, if a value at a first time for a weekly granularity is overridden from 70 to 140, the multiplier becomes 2. Similarly, for example, if the first time at the weekly granularity is an aggregation of 7 days in that week the multiplier of 2 can be applied to all of the 7 days.

Figure 6:
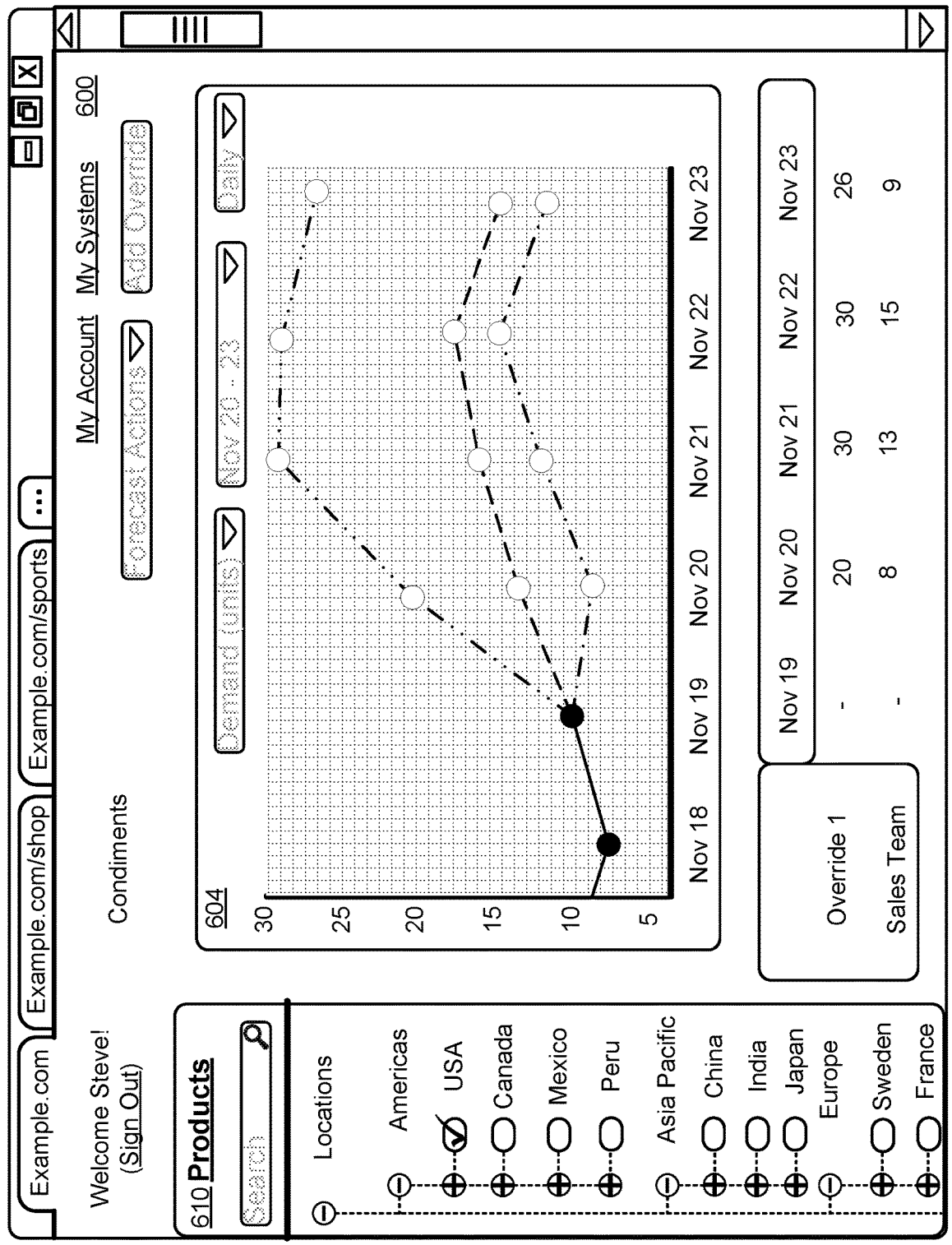
FIG. 6 shows an illustrative example of a user interface of a forecast visualization service for generating visualizations of time series data in accordance with an embodiment.

FIG. 6 illustrates an interface 600 in which various forecasts including derived forecasts are displayed in a visualization 604 in accordance with an embodiment. In various embodiments, users create demand plans based at least in part on the forecast and/or derived forecasts. Furthermore, as described above, in various embodiments where the user overrides one or more values of a forecast, as a result of the override being disaggregated to the lowest level of the hierarchy levels (if necessary), the derived forecast includes values at the lowest granularity. As a result, in such embodiments, the user can view the forecast at one or more higher hierarchy levels. For example, the values at the lowest hierarchy level can be aggregated to generate visualizations at the one or more higher hierarchy levels. As illustrated in FIG. 6, multiple forecasts and/or derived forecasts can be displayed on the visualization 604.

Figure 7:
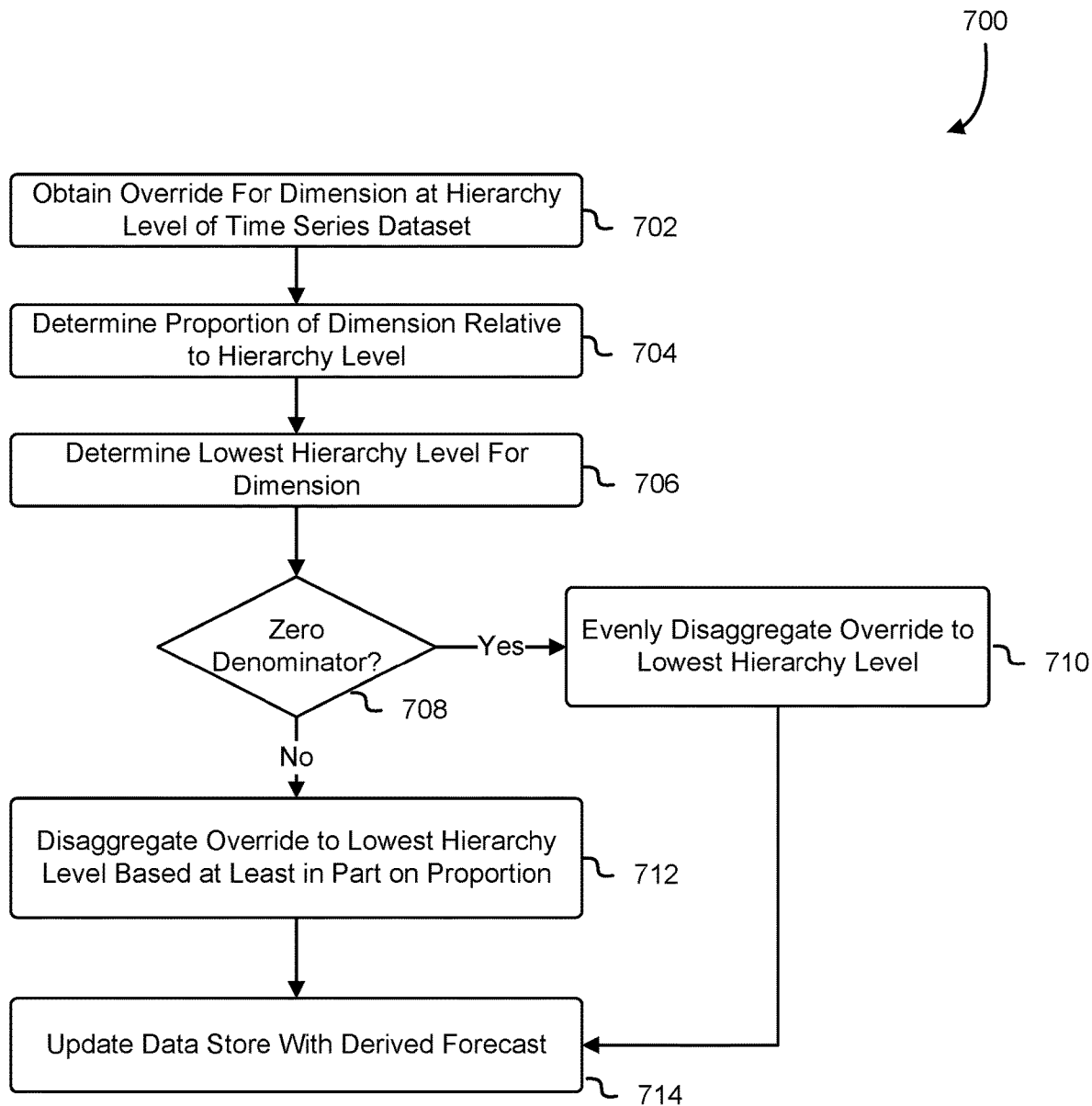
FIG. 7 shows an illustrative process for disaggregating override values within time series data in accordance with an embodiment.

FIG. 7 shows a process 700 for disaggregating an override of a value included in a forecast in accordance with an embodiment. The process 700, in an embodiment, is performed by a forecast visualization service or other service as described above. Now referring to FIGS. 7 and 8, the blocks of processes 700 and 800, described in the present disclosure, in various embodiments, include a computing process that is performed using any combination of hardware, firmware, and/or software. The various functions, processes, and/or operations described in the present disclosure may be carried out by a processor executing instructions stored in memory. The processes, for example, are embodied as computer usable instructions stored on computer storage media. In addition, in some embodiments, the processes are provided by a standalone application, a service or hosted service (standalone or in combination with another hosted service), or a plug-in to another product, to name a few. In addition, the processes 700 and 800 are described, by way of example, with respect to the computer systems of FIG. 1. However, these processes may additionally or alternatively be executed by any one system, or any combination of systems, including, but not limited to, those described in the present disclosure. In addition, various blocks of the processes 700 and 800 may be performed in different and/or alternative orders, performed in serial or parallel, or omitted entirely.

Returning to FIG. 7, the system executing the process 700, at block 702 obtains an override for a dimension at a hierarchy level of a time series dataset. As described above, the forecast visualization service, in an embodiment, provides an interface to a user to provide an override to a value of a forecast (e.g., a time series dataset). In one example, the override indicates a multiplier to apply to a particular value of the forecast. In another example, the override indicates a value to replace a particular value of the forecast. In various embodiments, the override includes information useable by the forecast visualization service to generate a derived forecast based at least in part on the override and the forecast.

At block 704, the system executing the process 700, determines the proportion of the dimension relative to the hierarchical level in accordance with an embodiment. In one example, the disaggregation of the override is based at least in part on the proportion of how much the lowest granularity (e.g., the values at the lowest hierarchy level) contributed towards the aggregated value included in the forecast for which the override is to be applied. In various embodiments, the proportion is determined by at least taking the values at the lowest hierarchy level divided by the aggregated value. For example, if the aggregated forecast for sales of ketchup in a region (e.g., a higher hierarchy level) is 10 and the value for the sales of ketchup in a first town (e.g., the lowest hierarchy level) is 1, the proportion for the first town is 1/10. Therefore, in such examples, when the override is disaggregated, the proportion is applied to the value of the override. Although proportions are described in accordance with various embodiments, various other methods for disaggregating an override can be using in accordance with the present disclosure such as evenly, logarithmic, or other means for disaggregating an override to one or more lower hierarchy levels.

In an embodiment, weights are applied to one or more dimensions during disaggregation of the overrider. For example, a first dimension is assigned a first weight such that when the override is disaggregated to one or more lower hierarchy levels the first dimensions is assigned a value (e.g., higher or lower relative to other dimensions) based at least in part on the first weight. In addition, in yet other embodiments, priorities are provided for disaggregation of an override. In one example, one dimension is prioritized over another dimension when disaggregating the override. In such examples, when modifying a demand forecast, users can prioritize particular dimensions (e.g., a city, region, product, category of products, etc.) such that modification is applied to the particular dimensions based at least in part on the priority assigned by the user. In an embodiment, the user selects a hierarchy level at which the override is disaggregated to. In one example, the user provides an override at the highest hierarchy level (e.g., continent) and indicates that the override is to be aggregated to a lower hierarchy level that is higher than the lowest hierarchy level (e.g., state). In such embodiments, the override can still disaggregate down to the lowest hierarchy level and stored by the system executing the process 700.

At block 706, the system executing the process 700, determines the lowest hierarchy level for the dimension associated with the override in accordance with an embodiment. As described above, the user, in an embodiment, specifics a plurality of hierarchy levels for the forecast. For example, the user specifics a plurality of location hierarchy levels such as continent, region, country, state, county, town, and neighborhood. Any logical grouping and/or organization of data can be used in connection with the embodiments described in the present disclosure.

Furthermore, the lowest hierarchy level, in various embodiments, corresponds to the granularity of the historical data and/or forecast data. For example, if the historical data includes time series data that is recorded daily, the lowest hierarchy level corresponds to daily data. Returning to the example above, if the forecast is generated such that values are predicted per neighborhood, the lowest hierarchy level is neighborhood.

At block 708, the system executing the process 700, determines if the proportion includes a zero denominator in accordance with an embodiment. For example, division by zero can lead to an error or undesired result. If the denominator is zero, the system executing the process 700 continues to block 710. At block 710, the system executing the process 700, evenly disaggregates the override to the lowest hierarchy level. For example, if the value of the override is 100 and there are 5 dimensions at the lowest hierarchy level, the dimensions are assigned the value 20. However, if the denominator is not zero, the system executing the process 700 continues to block 712. At block 712, the system executing the process 700, disaggregates the override to the lowest hierarchy level based at least in part on the proportion. For example, if the value of the override is 100 and the proportion for a particular dimension at the lowest hierarchy level is 1/5, the dimension is assigned the value 20. In various embodiments, when disaggregating time-based hierarchy levels, the system executing the process 700, determines that value for a first dimension at the lowest hierarchy level and applies that value to all dimensions at the lowest hierarchy level. For example, when disaggregating from a weekly hierarchy level to a daily hierarchy level, the system executing the process 700, determines the value for the first day and applies that value to the remaining days of the week. In an embodiment, any remainder value after applying the override at the lowest hierarchy level based at least in part on the proportion is assigned to a particular dimension (e.g., the last dimension). Returning to the example above, when disaggregating from a weekly hierarchy level to a daily hierarchy level, the system executing the process 700, assigns any reminder to the last day of the week.

At block 714, the system executing the process 700, updates a data store with the derived forecast in accordance with an embodiment. In various embodiments, the override is applied to a forecast and the forecast visualization service create a derived forecast based at least in part on the override. In one example, the derived forecast is saved as a new database table in a data store associated with the user. In various embodiments, a plurality of derived forecasts is generated based at least in part on disaggregation of overrides at various hierarchy levels.

Figure 8:
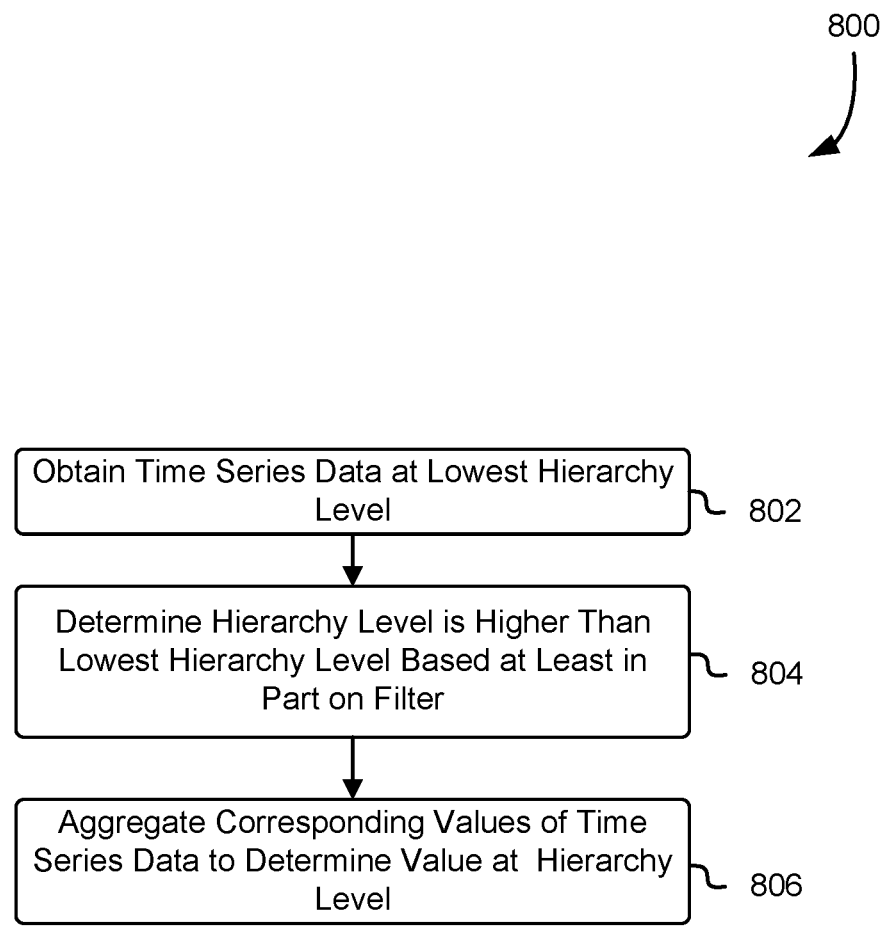
FIG. 8 shows an illustrative process for aggregating values within time series data in accordance with an embodiment.

FIG. 8 shows a process 800 for aggregating values included in a forecast in accordance with an embodiment. At block 802, the system executing the process 800, obtains time series data at a lowest hierarchy level. For example, as described above, a forecasting service generates time series data at a particular granularity (e.g., time interval, product, location, etc.) which is the lowest hierarchy level. In an embodiment, the time series data is provided to the forecast visualization service which generate visualizations based at least in part on filters selected by a user. At block 804, the system executing the process 800, determines a particular hierarchy level that is higher than a lower hierarchy level based at least in part on a filter in accordance with an embodiment. For example, if the forecast data is generated with a lowest hierarchy level of daily and the user selects a filter with the time interval set to monthly, the system executing the process 800 determines that the hierarchy level is higher.

At block 806, the system executing the process 800, aggregates the corresponding values of the time series data to determine the aggregated value at the hierarchy level indicated by the filter in accordance with an embodiment. In one example, the system executing the process 800, creates a query across a plurality of dimensions included in the filter at the lowest hierarchy level. In an embodiment, the aggregation includes row wide aggregation, column wide aggregation, or a combination thereof. Returning to the example above, if the filter causes the visualization to change from daily to monthly, the query is generated such that the value of the days in the month are aggregated into a single value.

Figure 9:
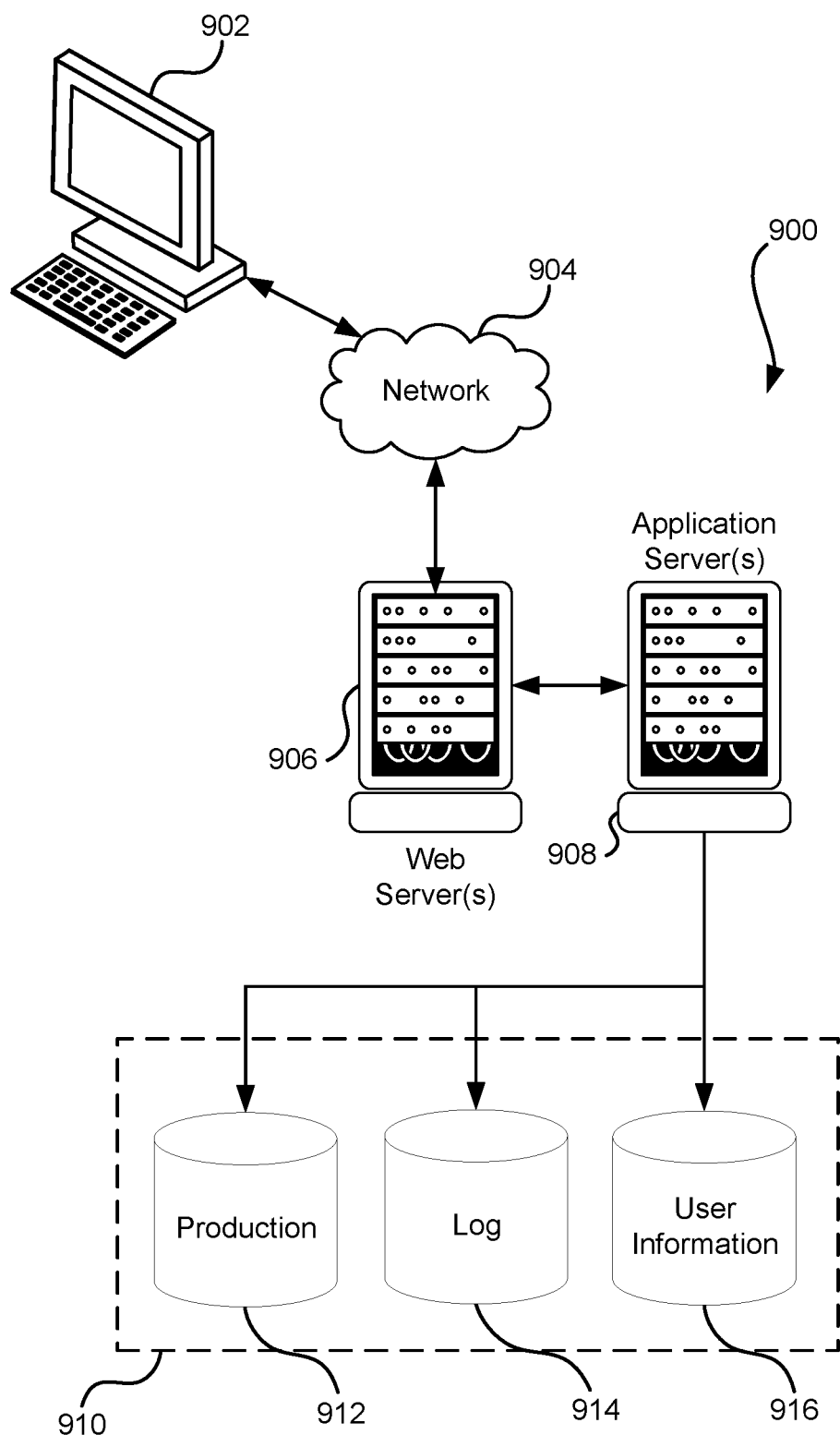
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes, or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a result listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining, at a demand planning service, a time series dataset, wherein the time series dataset includes a set of dimensions and a plurality of hierarchy levels where dimensions of the set of dimensions are associated with a particular hierarchy level of the plurality of hierarchy levels;
    generating forecasts of values for the set of dimensions based at least in part on the time series dataset to generate a forecasted time series dataset;
    storing, in a data store, the forecasted time series dataset for display to a user of the demand planning service;
    obtaining, at an interface of the demand planning service, an override value for a value of a first dimension of the set of dimensions of the forecasted time series dataset, the first dimension associated with a first hierarchy level being at least one level higher than a second hierarchy level;
    determining a set of proportions based at least in part on values of a subset of dimensions of the set of dimensions associated with the second hierarchy level relative to a total of the values of the subset of dimensions;
    disaggregating the override value to the values of the subset of dimensions based at least in part on the set of proportions to generate an override time series dataset including the plurality of hierarchy levels; and
    updating the data store to include the override time series data set.

2. The computer-implemented method of claim 1, wherein the second hierarchy level is a lowest hierarchy level.

3. The computer-implemented method of claim 1, wherein the computer-implemented method further comprises aggregating a set of values associated with a subset of dimensions of the set of dimensions to determine a value associated with the first hierarchy level.

4. The computer-implemented method of claim 3, wherein the computer-implemented method further comprises generating a query to obtain the subset of dimensions associated with the first hierarchy level.

5. A system, comprising:
    one or more processors; and
    a memory that stores computer-executable instructions that are executable by the one or more processors to cause the system to:

obtain, at a service, a set of values including a set of dimensions associated with a hierarchy level of a plurality of hierarchy levels;

obtain a forecasted set of values including forecasts of values for the set of dimensions generated based at least in part on at least one value of the set of values, where the forecasts of values are for display to the service;

obtain, from a computing device, a request, to enter on a graphical user interface (GUI) of a computing device, an override for the forecasted set of values associated with a second hierarchy level of the plurality of hierarchy levels, the second hierarchy level being higher than a first hierarchy level;

in response to the request, determine a set of proportions based at least in part on values of a subset of dimensions of the set of dimensions associated with the first hierarchy level relative to a total of the values of the subset of dimensions;

disaggregate the override to at least one value of the set of values in the first hierarchy level based at least in part on the set of proportions;

generate a derived forecast based at least in part on a result of the disaggregating the override; and cause the derived forecast to be stored such that the derived forecast is associated with the forecasted set of values.

6. The system of claim 5, wherein the memory further includes instructions that are executable by the one or more processors to cause the system to obtain a second override for the forecasted set of values associated with the second hierarchy level.

7. The system of claim 6, wherein the memory further includes instructions that are executable by the one or more processors to cause the system to disaggregate the second override by at least evenly distributing a value associated with the second override to the set of values.

8. The system of claim 5, wherein the memory further includes instructions that are executable by the one or more processors to cause the system to generate a visualization based at least in part on the forecasted set of values and the derived forecast.

9. The system of claim 8, wherein the computer-executable instructions that cause the system to generate the visualization further include instructions that are executable by the one or more processors to cause the system to generate the visualization by at least aggregating a subset of values based at least in part on a hierarchy level higher than a lowest hierarchy level.

10. The system of claim 9, wherein the computer-executable instructions that cause the system to generate the visualization further include instructions that are executable by the one or more processors to cause the system to generate a query to a database to obtain the subset of values.

11. The system of claim 10, wherein the memory further includes instructions that are executable by the one or more processors to cause the system to transmit the query to a database service.

12. The system of claim 5, wherein the computer-executable instructions that cause the system to disaggregate the override further include instructions that are executable by the one or more processors to cause the system to generate a query to determine a subset of values of the set of values to apply disaggregate.

13. A non-transitory computer-readable storage medium storing thereon executable instructions that, as a result of being executed by one or more processors of a computer system, cause the computer system to:

obtain, from a service, a dataset including a set of values, where the dataset is organized into a set of dimensions associated with values of the set of values and dimensions of the set of dimensions are associated with a set of hierarchy levels including at least a first hierarchy level that is lower than a second hierarchy level;

generate a forecasted dataset based at least in part on the dataset, wherein the forecasted dataset includes forecasts of the values of the set of dimensions;

cause the forecasted dataset to be displayed by the service;

obtain, from a client device, a request, via entering on a graphical user interface (GUI) of a computing device, for an override associated with at least one dimension of the set of dimensions at the second hierarchy level;

in response to the request, determine a set of proportions based at least in part on values of a subset of dimensions of the set of dimensions associated with the first hierarchy level relative to a total of the values of the subset of dimensions;

disaggregate the override to at least one value of the set of values in at least one dimension at the first hierarchy level based at least in part on the set of proportions; and generate a derived dataset based at least in part on a result of the disaggregating the override.

14. The non-transitory computer-readable storage medium of claim 13, wherein the service is a forecasting service.

15. The non-transitory computer-readable storage medium of claim 14, wherein the dataset is generated by the forecasting service based at least in part on historical data.

16. The non-transitory computer-readable storage medium of claim 15, wherein the instructions further comprise instructions that, as a result of being executed by the one or more processors, cause the computer system to cause the derived dataset to be stored in a database including the historical data.

17. The non-transitory computer-readable storage medium of claim 13, wherein the override indicates information for modifying a value of the set of values.

18. The non-transitory computer-readable storage medium of claim 13, wherein the override indicates information for modifying a plurality of values of the set of values.

19. The non-transitory computer-readable storage medium of claim 18, wherein the information indicates a percentage increase that is applied to the plurality of values.

20. The non-transitory computer-readable storage medium of claim 13, wherein the set of dimensions includes at least one of: product, time, channel, and location.

* * * * *

UNITED STATES PATENT AND TRADEMARK OFFICE
CERTIFICATE OF CORRECTION

| | | |
|---|---|---|
| PATENT NO. | : 11,789,977 B1 | Page 1 of 1 |
| APPLICATION NO. | : 17/486599 | |
| DATED | : October 17, 2023 | |
| INVENTOR(S) | : Chetan Mehta et al. | |

It is certified that error appears in the above-identified patent and that said Letters Patent is hereby corrected as shown below:

On the Title Page

Item (54) and in the Specification, Column 1, Lines 1-3, title:
HIERARCHICAL AGGREGATION AND DISAGGREATION OF TIME SERIES DATA FORECASTS Should read as:
HIERARCHICAL AGGREGATION AND DISAGGREGATION OF TIME SERIES DATA FORECASTS Signed and Sealed this
Twenty-second Day of July, 2025

Coke Morgan Stewart
*Acting Director of the United States Patent and Trademark Office*